US010690340B2

(12) United States Patent
Roychoudhury et al.

(10) Patent No.: US 10,690,340 B2
(45) Date of Patent: *Jun. 23, 2020

(54) FLAMELESS COOKING APPLIANCE

(75) Inventors: Subir Roychoudhury, Madison, CT (US); Richard T. Mastanduno, Milford, CT (US); Bruce Crowder, North Haven, CT (US); Benjamin D. Baird, Rocky Hill, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 1913 days.

This patent is subject to a terminal disclaimer.

(21) Appl. No.: 12/655,703

(22) Filed: Jan. 6, 2010

(65) Prior Publication Data
US 2011/0165300 A1 Jul. 7, 2011

(51) Int. Cl.
*F23D 14/18* (2006.01)
*F24C 3/06* (2006.01)
(Continued)

(52) U.S. Cl.
CPC .............. *F23D 14/18* (2013.01); *F23C 13/08* (2013.01); *F23D 11/40* (2013.01); *F24C 3/067* (2013.01); *F23D 2212/20* (2013.01); *F23D 2214/00* (2013.01); *Y02B 40/166* (2013.01); *Y02E 20/342* (2013.01)

(58) Field of Classification Search
CPC ...... F23D 14/18; F23D 11/40; F23D 2214/00; F23D 2212/20; F23C 13/08; F23C 13/00; F24C 3/067; Y02E 20/342; Y02B 40/166
USPC ........ 126/39 F, 39 J, 25 R, 92 AC; 431/2, 7, 431/243, 328, 329, 354
See application file for complete search history.

(56) References Cited

U.S. PATENT DOCUMENTS 1,799,565 A * 4/1931 Patterson ................. A62C 4/00
220/88.2
3,299,938 A * 1/1967 Bally ....................... F23D 14/12
126/92 R
(Continued)

FOREIGN PATENT DOCUMENTS

| DE | 3815647 A1 * | 12/1988 | ............... F28D 7/02 |
| WO | WO 2004060546 A2 | 7/2004 | |
| WO | WO 2008048353 A2 | 4/2008 | |

OTHER PUBLICATIONS

Co-pending U.S. Appl. No. 12/587,593, filed Oct. 8, 2009, in the names of Subir Roychoudhury, et al.; unpublished.
(Continued)

*Primary Examiner* — David J Laux
(74) *Attorney, Agent, or Firm* — Marie F. Zuckerman; Andrew D. Gathy

(57) ABSTRACT

A flameless cooking apparatus for use with liquid fuels and for indoor or outdoor use under field operations. The burner exhibits low CO and hydrocarbon emissions and meets standards for burner thermal efficiency when used with JP-8 fuel. The apparatus employs a catalytic burner having among its parts (i) a combustion catalyst; (ii) a conductive surface, e.g., cooking surface; and (iii) in between the catalyst and the conductive surface and in direct physical contact with both surfaces, a heat spreader for conductively transferring heat of combustion from the catalyst to the conductive surface. Also claimed are a method of heat flux and a method of cooking.

13 Claims, 6 Drawing Sheets

(51) Int. Cl.
*F23D 11/40* (2006.01)
*F23C 13/08* (2006.01)

(56) References Cited

U.S. PATENT DOCUMENTS

| | | | | |
|---|---|---|---|---|
| 3,525,325 | A | * | 8/1970 | Perl ............................ 126/39 J |
| 3,661,295 | A | * | 5/1972 | Grunwald ............... F02B 77/10 |
| | | | | 220/88.2 |
| 3,931,805 | A | | 1/1976 | Nelson |
| 4,047,876 | A | | 9/1977 | Rice |
| 4,138,220 | A | | 2/1979 | Davies |
| 4,180,384 | A | | 12/1979 | Rice |
| 4,189,294 | A | * | 2/1980 | Rice ........................ F23D 14/18 |
| | | | | 126/39 J |
| 4,255,121 | A | | 3/1981 | Sugimoto |
| 4,473,004 | A | | 9/1984 | Wells |
| 4,766,877 | A | * | 8/1988 | Jensen ..................... F24C 3/042 |
| | | | | 126/92 AC |
| 4,773,847 | A | | 9/1988 | Shukla |
| 5,000,676 | A | * | 3/1991 | Fiala ................................ 431/7 |
| 5,051,241 | A | | 9/1991 | Pfefferle |
| 5,104,309 | A | * | 4/1992 | Krieger ............................ 431/7 |
| 5,218,952 | A | * | 6/1993 | Neufeldt ................. 126/92 AC |
| 5,224,856 | A | * | 7/1993 | Nakamura .................... 431/328 |
| 5,251,609 | A | * | 10/1993 | Thibault ................. F23D 14/18 |
| | | | | 126/39 J |
| 5,375,997 | A | * | 12/1994 | Nakamura et al. ........... 431/115 |
| 5,468,143 | A | * | 11/1995 | Weber et al. ................. 431/243 |
| 5,496,171 | A | * | 3/1996 | Ozawa et al. ................ 431/326 |
| 5,641,282 | A | * | 6/1997 | Lee et al. .......................... 431/7 |
| 5,655,437 | A | | 8/1997 | Vitacca |
| 5,725,151 | A | | 3/1998 | Hetrick |
| 6,176,233 | B1 | | 1/2001 | Babington |
| 6,213,761 | B1 | | 4/2001 | Schmidt |
| 6,491,236 | B1 | | 12/2002 | Keller |
| 6,669,467 | B2 | * | 12/2003 | Kieswetter .................... 431/154 |
| 6,746,657 | B2 | | 6/2004 | Castaldi |
| 6,872,072 | B2 | * | 3/2005 | Kieswetter .................... 431/154 |
| 7,380,548 | B2 | | 6/2008 | Ryan |
| 7,637,258 | B2 | * | 12/2009 | Cosgrove .................... 126/25 R |
| 7,857,617 | B2 | * | 12/2010 | O'Donnell et al. .......... 431/354 |
| 2002/0160330 | A1 | * | 10/2002 | Eroglu ....................... F23R 3/40 |
| | | | | 431/278 |
| 2003/0213485 | A1 | * | 11/2003 | Kieswetter .................. 126/92 R |
| 2004/0209205 | A1 | | 10/2004 | Gomez |
| 2005/0028445 | A1 | | 2/2005 | Roychoudhury |
| 2007/0151154 | A1 | | 7/2007 | Lyubovsky |
| 2008/0078175 | A1 | | 4/2008 | Roychoudhury |
| 2008/0127553 | A1 | | 6/2008 | Roychoudhury |
| 2009/0113889 | A1 | | 5/2009 | Roychoudhury |

OTHER PUBLICATIONS

Co-pending U.S. Appl. No. 12/655,702, filed Jan. 6, 2010, in the names of Subir Roychoudhury, et al.; unpublished.

* cited by examiner

FLAMELESS COOKING APPLIANCE

This invention was made with support from the U.S. government under U.S. Contract No. W911QY-09-C-0028. The U.S. Government holds certain rights in this invention.

FIELD OF THE INVENTION

This invention pertains to a flameless combustion apparatus for use in heat transfer processes, such as, cooking processes. More specifically, this invention pertains to a flameless cooking appliance designed to be portable for use in outdoor and indoor field operations, and preferably, designed for a liquid fuel.

BACKGROUND OF THE INVENTION

Portable cooking devices are well known in the art. Such devices find utility in "backyard" barbecues, in camping and recreational environments, and in preparing meals for military personnel on field operations, displaced persons in refugee camps, and victims of storms. A modern-day field burner should be capable of utilizing a variety of fuels, including gasoline, kerosene, ethanol, methanol, diesel, and aircraft jet fuels, such as JP-4, JP-5, JP-7, and JP-8. For modern day field operations, JP-8 is preferred for its high boiling point and low volatility and for its safer handling and transportation, as compared with more volatile fuels. The fact that JP-8 is already used as a ground and air transport fuel makes it desirable to be used more generally in other operations, such as for heating and cooking. On the other hand, JP-8 has one of the highest boiling point ranges, specifically a boiling point range between about 166° C. (330° F.) and about 277° C. (530° F.), which makes JP-8 among the most difficult fuels to vaporize. Moreover, JP-8 tends to soot and therefore is one of the most difficult fuels with which to achieve clean combustion.

U.S. Pat. No. 7,380,548 B2 (hereinafter "Ryan") discloses a stove operating on diesel fuel and suitable for field operations. The stove consists of a frame bounding an area to receive, among other elements, a burner and a heating cavity assembly. A diffuser plate is mounted on the heating cavity assembly and covers an open top portion thereof, the diffuser plate being configured to receive heated gases rising from the burner, and to distribute said heated gases evenly proximate an upper surface of the diffuser plate. A griddle plate is mounted above the diffuser plate as a cooking surface.

U.S. Pat. No. 6,176,233 B1 (hereinafter "Babington") discloses a powered multi-fuel burner for heating a heating cabinet of a cooking station useful in field operations. Babington discloses use of a variety of fuels, including JP-8. More specifically, Babington discloses a frame that may be positioned in an existing heating cabinet of a field cooking facility, such as an M-59 Field Range Heating Cabinet. A heat plenum is located at one end of the frame, the front side of the heat plenum receiving a flame tube from a burner assembly. The top of the heat plenum has an aperture surface which functions as a flame spreader, emitting hot gases, but no flame, to produce cooking heat without producing soot on adjacent surfaces U.S. Pat. No. 4,773,847 B1 (hereinafter "Shukla") discloses a liquid diesel-fueled thermoelectric field burner suitable for field operations. As seen from FIG. 1 of Shulka, a rechargeable battery powers the initial start-up which atomizes the liquid fuel; then simultaneous excitation of a glow coil triggers combustion which propagates throughout a preheat burner. Finally, a preheated vaporized mixture of fuel and air are combusted in a main burner under blue flame; and the heat of combustion is transferred by radiation and convection of hot combustion gases to a cooking load.

The aforementioned cooking apparatuses disclosed by Ryan, Babington, and Shukla require a flame burner, which results in inefficient heat transfer, excess consumption of fuel and oxidant, and unacceptably high emissions of carbon monoxide and incompletely oxidized hydrocarbons. Such apparatuses cannot readily be used indoors.

Other art teaches flameless cooking appliances; for example, U.S. Pat. No. 5,655,437 (hereinafter "Vitacca") teaches a flameless charcoal burner system that prevents flames from singeing food or flaring toward the user. As best can be described, the burner employs heated charcoals in a side burner system that is in a spaced-apart relation to the cooking grill, the grill being heated by hot gas convection. The apparatus is useful as a "back-yard" barbecue device, but not under field operations with liquid fuels.

Another flameless barbecue grill is disclosed in U.S. Pat. No. 3,931,805 (hereinafter "Nelson"), comprising a surface for supporting food and a burner assembly positioned below in spaced-apart relation to the food supporting surface. The assembly includes a plurality of burner elements that provides a flameless incandescent heating area when supplied with an ignited mixture of gaseous fuel and air. Nelson disadvantageously employs a gaseous fuel under ignition conditions and cannot operate with liquid fuels.

U.S. Pat. No. 4,138,220 (hereinafter "Davies") discloses a flameless apparatus for catalytically oxidizing grease, fats, oils, and/or other hydrocarbons in rising fumes from cooking processes. The apparatus involves catalytic post-combustion of waste gas and is neither intended nor useful for cooking food.

Finally, flameless oven broilers are well known as taught, for example, in U.S. Pat. No. 4,473,004 (hereinafter "Wells"), wherein thermoelectric elements overhead of a cooking surface proceed to cook food via radiant infrared heat.

Among teachings to other kinds of flameless combustion devices, which disclosures do not explicitly mention cooking, there is found U.S. Pat. No. 4,180,384 (hereinafter "Rice"), which teaches a vaporized fuel consisting of a "lower alcohol" or "lower ether or hydrocarbon," being passed with air in downflow direction through a catalyst bed consisting of solid porous pellets containing high and low concentrations of platinum family metals deposited on a support, such as alumina or sieves, with resulting catalytic combustion. Hot combustion gases exit through a surface containing a plurality of apertures or openings.

In view of the above, the art needs an improved flameless cooking appliance that is robust, portable, useful in field operations, and adaptable for use with liquid fuels, desirably, JP-8 fuel. Additionally, the flameless cooking appliance should provide acceptably low exhaust emissions such that the appliance can be safely used in indoor applications.

SUMMARY OF THE INVENTION

In one aspect, this invention comprises a catalytic burner comprising:
(i) a combustion catalyst;
(ii) a heat conductive surface; and
(iii) a heat spreader means, positioned in between and in direct contact with the combustion catalyst and with the heat conductive surface, for conductively transferring heat from the combustion catalyst to the heat conductive surface.

In another aspect, this invention comprises a method for heat flux comprising:

(a) providing a catalytic burner comprising (i) a combustion catalyst; (ii) a heat conductive surface; and (iii) a heat spreader means, positioned in between and in direct contact with the combustion catalyst and with the heat conductive surface, for conductively transferring heat from the combustion catalyst to the heat conductive surface;

(b) providing a fuel and an oxidant;

(c) igniting the combustion catalyst so as to obtain flameless combustion of the fuel and the oxidant with generation of heat of reaction;

(d) transferring the heat of reaction via conduction from the combustion catalyst to the heat conductive surface.

The catalytic burner of this invention provides a method of heat flux that relies primarily upon heat transfer via thermal conduction and secondarily via convection and radiation. The burner itself is secured in direct physical and thermal contact with a heat spreader, which itself is secured in direct physical and thermal contact with a conductive surface. Accordingly, the burner produces a significant component of heat flux via thermal conduction. In contrast, prior art burners rely essentially upon convection of hot gases and/or radiant heat as a means of heat flux. As compared with convective and radiative heat flux, conduction advantageously provides for more uniform heat distribution and reduced hot spots throughout the catalyst, thus allowing for a lower catalyst operating temperature.

The catalytic burner of this invention can be employed in a variety of applications involving heat transfer, including cooking on the conductive surface, either directly or indirectly via cooking utensils. The burner may also be used as a source of heat, for example, as in an oven wherein an air flow over the conductive surface gives rise to hot air convection heating.

In a third aspect, this invention provides a flameless cooking appliance comprising:

(a) a combustion chamber comprising a catalytic burner positioned as the top horizontal wall of the chamber, and further comprising one or more contiguous walls enclosing a volume of space within which flameless combustion occurs;

(b) a fuel inlet means for feeding a fuel into the combustion chamber;

(c) an oxidant first inlet means for feeding an oxidant into the chamber;

(d) optionally, an oxidant second inlet means for feeding additional oxidant into the chamber;

(e) an ignition means for igniting a combustion catalyst, the ignition means positioned within the chamber;

(f) an outlet means for exhausting combustion gases from the chamber; and (g) wherein the catalytic burner comprises (i) a combustion catalyst positioned interior to the chamber in a direction downstream of fuel and oxidant flows; (ii) a heat conductive surface positioned downstream of the catalyst, the heat conductive surface comprising an exterior face positioned exterior to the chamber and an interior face positioned interior to the chamber; and (iii) a heat spreader means, positioned in between and in direct contact with the combustion catalyst and the interior face of the heat conductive surface, for conductively transferring heat of combustion from the catalyst to the exterior face of the heat conductive surface.

In a fourth aspect, this invention provides a cooking method comprising:

(1) providing a flameless cooking appliance comprising (a) a chamber comprising a catalytic burner positioned as a top horizontal wall and further comprising one or more contiguous walls enclosing a volume of space within which flameless combustion occurs; (b) a fuel inlet means for feeding a fuel into the chamber; (c) an oxidant first inlet means for feeding an oxidant into the chamber; (d) optionally, an oxidant second inlet means for feeding additional oxidant into the chamber; (e) an ignition means for igniting a combustion catalyst, the ignition means positioned within the chamber; (0 an outlet means for exhausting combustion gases from the chamber; and (g) wherein the catalytic burner comprises (i) a combustion catalyst positioned interior to the chamber in a direction downstream of fuel and oxidant flows; (ii) a heat conductive surface positioned downstream of the catalyst; the heat conductive surface comprising an exterior face exterior to the chamber and an interior face interior to the chamber; and (iii) a heat spreader means positioned in between and in direct contact with the combustion catalyst and the interior face of the heat conductive surface, for conductively transferring heat of combustion from the catalyst to the exterior face of the heat conductive surface;

(2) feeding a fuel through the fuel inlet means into the chamber, (3) feeding an oxidant through the oxidant first inlet means into the chamber, (4) optionally, feeding additional oxidant through the oxidant second inlet means into the chamber;

(5) contacting a mixture of the fuel and oxidant in the chamber with the combustion catalyst;

(6) igniting the combustion catalyst and thus flameless combustion of the fuel and oxidant with resulting heat of reaction, which is conductively transferred from the catalyst to the exterior face of the heat conductive surface; and (7) heating a source of food or heating a cooking utensil on the exterior face of the heat conductive surface.

The flameless cooking apparatus of this invention incorporates several novel and advantageous features. First, the cooking apparatus of this invention employs a combustion catalyst, preferably having high surface area per unit volume, which catalyst is also resistant to degradation by vibrations, thermal stresses, and stresses due to transportation and handling. Since the combustion catalyst is placed in thermal conductive contact with the heat conductive surface, for example, the cooking surface, heat flux via conduction is rapid and more efficient as compared with heat flux via gas convection or infrared radiation as known in prior art cooking appliances. Improved heat efficiency correlates with an improved heating rate per unit weight of apparatus, as well as a more rapid startup and transient response. Moreover, the flameless cooking apparatus of this invention can be advantageously used with both gaseous and liquid fuels, preferably, diesel fuels, and more preferably, JP-8 fuel. Moreover, the apparatus provides for an acceptably low level of exhaust emissions, such that the apparatus should be safely operated indoors. Acceptable emissions for indoor use are targeted at less than 10 parts per million (ppm) carbon monoxide and less than 100 ppm hydrocarbons; but these values are only guidelines. Specific emission requirements may vary with the desired application. Advantageously, the catalytic burner of this invention provides a combustion efficiency (defined as fuel-in to burner-output thermal efficiency) of greater than about 75 percent, more desirably, greater than about 95 percent.

In addition to the above, the cooking apparatus of this invention is rugged, quiet with low acoustic signature, suitable for indoor as well as outdoor use, and can be designed to be portable for use in field operations. The apparatus can be interfaced with Balance of Apparatus (BOA) components, including pump(s), sensor(s), and blower(s), of acceptable size and power draw for any utility envisioned.

DRAWINGS

DETAILED DESCRIPTION OF THE INVENTION

Figure 1:
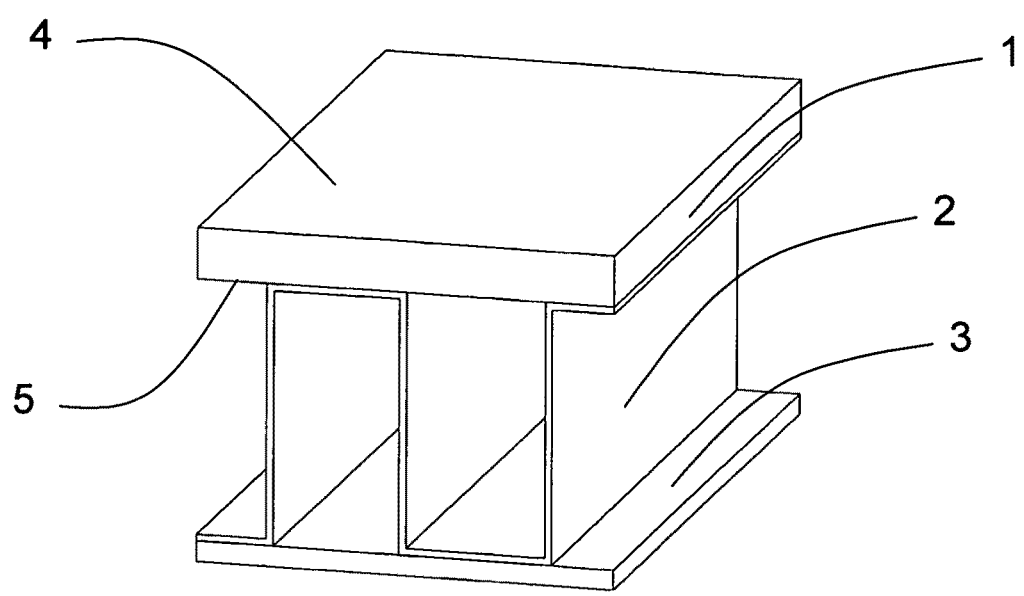
FIG. 1 depicts an expanded view of a catalytic burner in accordance with the present invention.

In a preferred aspect, with reference to FIG. 1, this invention provides for a catalytic burner comprising (i) a combustion catalyst (3); (ii) a heat conductive surface (1); and (iii) a corrugated heat spreader means (2) positioned in between and in direct contact with the combustion catalyst and with the heat conductive surface, for conductively transferring heat from the combustion catalyst to the heat conductive surface. The heat conductive surface (1) comprises an interior face (5) and an exterior face (4), the interior face (5) contacting the heat spreader means (2).

In a second preferred aspect, this invention comprises a method for heat flux comprising (a) providing a catalytic burner comprising (i) a combustion catalyst; (ii) a heat conductive surface; and (iii) a corrugated heat spreader means positioned in between and in direct contact with the combustion catalyst and with the heat conductive surface, for conductively transferring heat from the combustion catalyst to the heat conductive surface; (b) providing a fuel and an oxidant; (c) igniting the combustion catalyst so as to obtain flameless combustion of the fuel and the oxidant with generation of heat of reaction; and (d) transferring the heat of reaction via conduction through the catalytic burner to the heat conductive surface.

Figure 2:
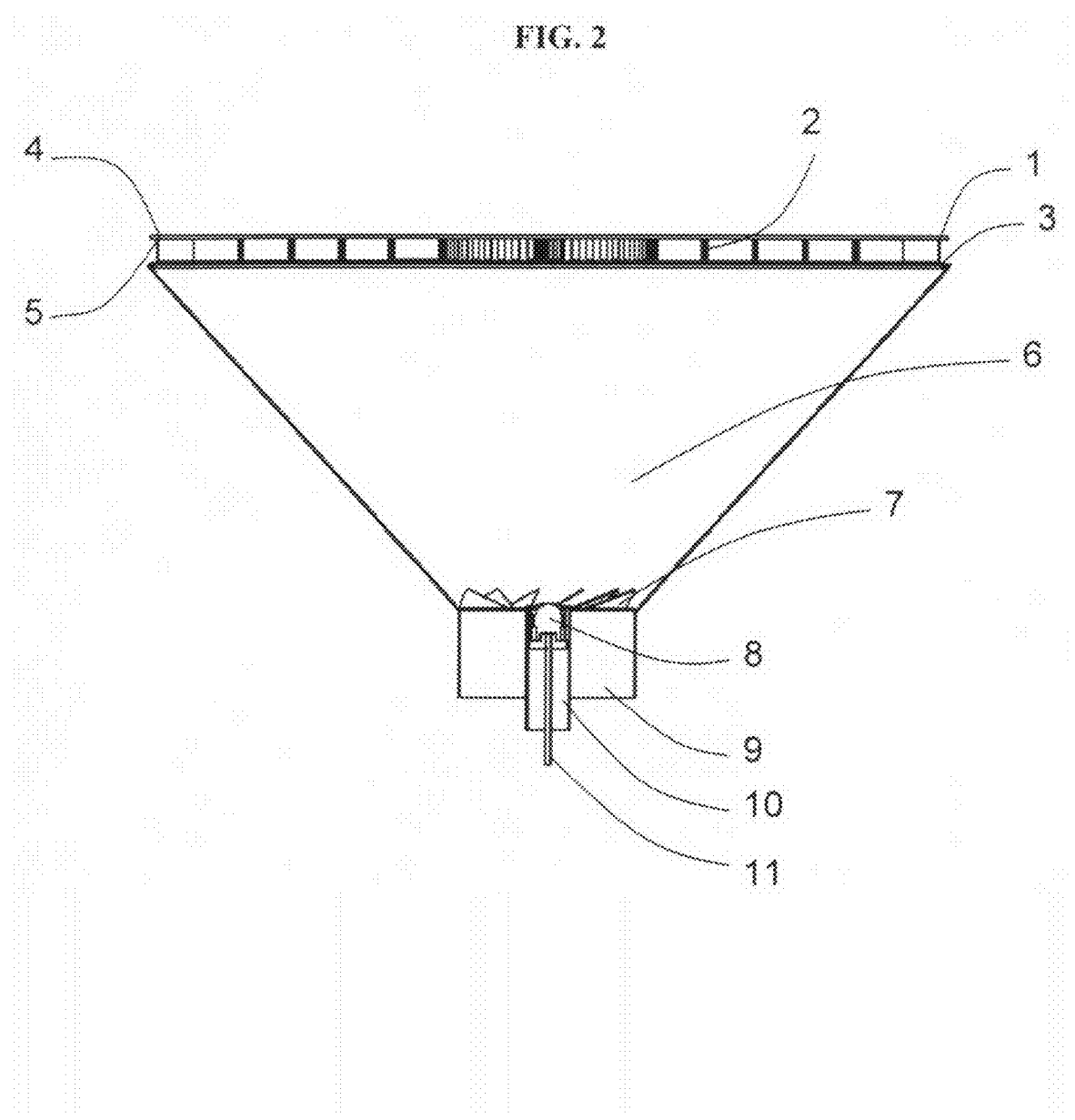
FIG. 2 depicts a flameless cooking apparatus in accordance with the present invention.

In a third preferred aspect, with reference to FIG. 2, this invention provides a flameless cooking appliance comprising a catalytic burner (composite parts 1, 2, and 3) positioned as the top horizontal wall of a combustion chamber (6), which further comprises one or more contiguous walls enclosing a volume of space within which flameless combustion occurs. Fuel inlet means (11) feeds fuel into the combustion chamber. The fuel more preferably comprises a liquid fuel, most preferably, JP-8 fuel. An oxidant first inlet means (9) feeds an oxidant into the chamber. Optionally, an oxidant second inlet means (10) feeds additional oxidant into the chamber. The catalytic burner assembly comprises (i) a combustion catalyst (3) positioned interior to the chamber in a direction downstream of fuel and oxidant flows; (ii) a heat conductive surface (1) positioned downstream of the catalyst, the heat conductive surface comprising an exterior face (4) positioned exterior to the chamber and an interior face (5) positioned interior to the chamber; and (iii) a corrugated heat spreader means (2), positioned in between and in direct contact with the combustion catalyst (3) and the interior face (5) of the heat conductive surface, for conductively transferring heat of combustion from the catalyst to the exterior face (4) of the heat conductive surface. The corrugated heat spreader (2) contains channels that provide an exit pathway for exhausting combustion gases. The cooking apparatus of FIG. 2 further comprises a swirler (7) for mixing the fuel and oxidant fed through the various inlets. Swirler (7) is positioned at the exit of the various fuel and oxidant inlet paths in a perpendicular relation relative to the direction of fuel and air flows. Swirler (7) is also positioned in spaced-apart relation from and parallel to the catalytic burner (top wall) as shown in FIG. 2. While not shown in FIG. 2, a spark plug or glow plug may be positioned within the combustion chamber as a means of igniting a flame so as to light-off the catalyst (3), as described in detail hereinafter. The cooking apparatus of FIG. 2 may also comprise a fuel/air injection nozzle (8) for dispersing the fuel and any additional oxidant fed into the combustion chamber via inlet ports 10 and 11.

Oxidant inlet 9 is the primary inlet for feeding the oxidant, whereas oxidant inlet 10 is an optional feature. The purpose of oxidant inlet 10 is to facilitate atomizing the fuel fed through fuel inlet 11 and to facilitate cooling when a pressurized fuel injector-atomizer is employed. Consequently, optional oxidant inlet 10 is a preferred feature when a liquid or heavier fuel is employed, such as JP-8. The oxidant is advantageously split between inlet 9 and inlet 10 in a range from about 80/20 to 100/0. An oxidant split of about 90 percent to inlet 9 and about 10 percent to inlet 10 is preferred. It is noted that the oxidant entering through oxidant inlet 9 is advantageously a recuperated feed, meaning that the oxidant has been passed through a heat exchange zone to recuperate heat from the exhaust gases and to preheat the inlet oxidant for higher burner efficiency.

In a fourth aspect, this invention provides a preferred cooking method comprising:

(1) providing a flameless cooking appliance comprising
(a) a chamber comprising a catalytic burner positioned as a top horizontal wall and further comprising one or more contiguous walls enclosing a volume of space within which flameless combustion occurs; (b) a fuel inlet means for feeding a fuel into the chamber; (c) an oxidant first inlet means for feeding an oxidant into the chamber; (d) optionally, an oxidant second inlet means for feeding additional oxidant into the chamber; (e) an igniter for igniting a combustion catalyst, the igniter being positioned within the chamber; (f) an outlet means for exhausting combustion gases from the chamber; and (g) wherein the catalytic burner comprises (i) a combustion catalyst comprising an ultra-short-channel-length metal substrate positioned interior to the chamber in a direction downstream of fuel and oxidant flows; (ii) a heat conductive surface positioned downstream of the catalyst, the heat conductive surface comprising an exterior face exterior to the chamber and an interior face interior to the chamber; and (iii) a corrugated heat spreader means, positioned in between and in direct contact with the combustion catalyst and the interior face of the heat conductive surface, for conductively transferring heat of combustion from the catalyst to the exterior face of the heat conductive surface;

(2) feeding a fuel through the fuel inlet means into the chamber, (3) feeding an oxidant through the oxidant first inlet means into the chamber, (4) optionally, feeding additional oxidant through the oxidant second inlet means into the chamber;

(5) contacting a mixture of the fuel and oxidant in the chamber with the combustion catalyst;

(6) igniting the catalyst and thus flameless combustion of the fuel and oxidant with resulting generation of heat, which is conductively transferred from the catalyst to the exterior face of the heat conductive surface; and (7) heating a source of food or heating a cooking utensil on the exterior face of the heat conductive surface.

Any conventional oxidant may be employed in the cooking process of this invention, preferably, a gaseous oxidant, more preferably, air or oxygen. The invention is not limited to these conventional oxidants and others oxidants, such as ozone, or a mixture of oxygen with an inert gas, e.g., helium, may likewise be employed if so desired. Any conventional fuel may be employed with the cooking apparatus, including gaseous and liquid hydrocarbons, for example, methane, ethane, propane, butane, aromatics, naphthenes, long chain paraffins (e.g., $C_{6-16}$ paraffins), cycloparaffins, and mixtures thereof. A preferred fuel comprises a mixture of liquid hydrocarbons, more preferably, those liquid hydrocarbon mixtures used as diesel and/or jet fuels, including but not limited to JP-4, JP-5, JP-7, and JP-8. Most preferably, the fuel employed is JP-8 fuel.

The walls of the combustion chamber (excluding the top wall to be discussed hereinafter in detail) can be constructed from any material that is capable of withstanding the combustion conditions. Suitable materials include, without limitation, aluminum, stainless steel, cast iron, and any suitable alloy, preferably, a steel alloy. The fuel is fed through the fuel inlet, vaporized if necessary, mixed with oxidant in the combustion chamber, and ultimately oxidized catalytically on contact with a combustion catalyst in a flameless combustion. Vaporization, mixing, and optionally, recuperation of heat from exhaust gases are the primary contributors to the overall combustor dimensions. Preferably, for the burner to be highly efficient, a recuperator is employed to extract energy from the combustion exhaust gases, which extracted heat is used to preheat the oxidant in the oxidant first inlet means (FIG. 2 (9)).

The liquid fuel is typically atomized into fine liquid droplets which are mixed with the gaseous oxidant in the combustion chamber. Atomization of the liquid fuel can be conducted in any conventional manner; for example, in a preferred method oxidant is pressurized and injected with the fuel through a fuel/air injection nozzle (atomizer, sprayer), as shown in FIG. 2 (8). Alternatively, the fuel can be pressurized and injected with the oxidant through the nozzle. As another possibility, an electrosprayer can be employed at the fuel inlet nozzle, as described in detail in U.S. patent application Ser. No. 10/401,226, in the names of Gomez and Roychoudhury, filed on Mar. 27, 2003, and claiming priority from U.S. Provisional Patent Application No. 60/368,120, incorporated herein in their entirety by reference. The mixture of fuel and oxidant is essentially completely vaporized prior to reaching the combustion catalyst.

To minimize the volume of the combustion chamber, optionally, a swirling means ("swirler") is installed to provide a whirling flow field that introduces oxidant with a tangential velocity component into the combustion chamber. (See FIG. 2 (7)) The swirler provides for markedly improved temperature uniformity on the catalytic surface (3), which is crucial for efficient coupling to the heat spreader (2) and hence the conductive surface (1). Uniformity of temperature relates directly to the homogeneity of the local equivalence ratio, defined as the ratio of the actual mole ratio of fuel to oxidant combusted at any local site on the catalyst relative to the mole ratio of fuel to oxidant of the stoichiometric combustion reaction (i.e., the mole ratio of fuel to oxidant for perfect combustion to $CO_2$ and $H_2O$). In a preferred embodiment, a low pressure drop radial swirler is coaxially located with the fuel nozzle a few millimeters downstream of the atomizer. This preferred embodiment results in uniform mixing of the atomized fuel droplets and inlet air, including fresh inlet air and recuperated air described hereinafter. The swirler may be purchased commercially or made in-house. The swirler may have any suitable shape, including a circular or non-circular structure, and any suitable fin or structural design for mixing a gas flow. The fins may have a corrugated structure; but are not necessarily limited thereto. Any angle of fin structure ranging from about a 5 degree to about 80 degree angle relative to horizontal is suitable. Other swirling means, such as but not limited to fins, tabs, and tangential holes, may alternatively be employed to introduce a tangential swirl into the mixture of fuel and oxidant.

The fuel is essentially fully vaporized and mixed with the oxidant in the combustion chamber and directed towards the catalyst. Catalyst light-off can be implemented through any conventional ignition means, such as a glow plug, spark, or a cable heater adjacent to the catalyst substrate. In the glow plug or spark method, a flame obtained from ignition of the fuel and air heats the catalyst to its light-off temperature, at which temperature the catalytic combustion is self-sustaining. At this temperature the flame is typically extinguished either by increasing air flow or decreasing fuel flow while maintaining flameless catalytic combustion.

The combustion catalyst advantageously comprises an ultra-short-channel-length metal substrate, and preferably, comprises one or more noble metals (e.g., platinum, palladium, rhodium, and/or other known noble metals) deposited on an ultra-short-channel-length metal substrate, for efficient and effective flameless combustion of the fuel with the oxidant with generation of heat of combustion. This type of catalyst can be preferably employed in a mesh or foam form; but the invention is not limited to such structures, and other structures may be suitable. In a preferred embodiment, the catalyst comprises Microlith® brand ultra-short-channel-length metal mesh substrate commercially available from Precision Combustion, Inc., located in North Haven, Conn. Microlith® brand ultra-short-channel-length metal mesh substrate technology is a novel catalyst design concept comprising a series of ultra-short-channel-length, low thermal mass, metal monoliths that replace conventional prior art monoliths having longer channel lengths. For the purposes of this invention, the term "ultra-short-channel-length" refers to channel lengths in a range from about 25 microns (μm) (0.001 inch) to about 500 microns μm (0.02 inch). In contrast, the term "long channels" pertaining to prior art monoliths refer to channel lengths greater than about 5 mm (0.20 inch).

The preferred Microlith® brand ultra-short-channel-length metal mesh substrate promotes the packing of more active area into a small volume and provides increased reactivity area for a given pressure drop, as compared with prior art monoliths. Whereas in a conventional honeycomb monolith having conventional long channels, a fully developed boundary layer is present over a considerable length of the device; in contrast, the ultra-short-channel-length characteristic of the Microlith® brand substrate avoids boundary layer buildup. Since heat and mass transfer coefficients depend on the boundary layer thickness, avoiding boundary layer buildup enhances transport properties. The advantages of employing the ultra-short-channel-length metal substrate, and preferably, the Microlith® brand ultra-short-channel-length metal mesh substrate, to control and limit the development of a boundary layer of a fluid passing therethrough is described in U.S. patent application Ser. No. 10/832,055 which is a Continuation-In-Part of U.S. Pat. No. 6,746,657 to Castaldi, both incorporated in their entirety herein by reference.

The average residence time of the fuel/oxidant mixture across the catalyst is estimated at about 0.8 milliseconds (ms), which is much smaller than the estimated evaporative and mixing time of the fuel with oxidant. The prevailing Peclet number, which controls the necessary packing density to achieve essentially complete fuel conversion, is estimated at 30, which may require the stacking of several layers of catalyst for fuel conversions greater than about 90 percent. Thus, the metal substrate may be used in one layer, if desired; but, stacking a plurality of substrate layers from about 2 to about 20 layers, is preferred. Since durability tests show that the catalyst performance does not deteriorate significantly over a period of about 500 hours or more, it is anticipated that replacement of the catalyst may not be needed more frequently than about 1000 hours or more of operation.

Advantageously, the combustion is operated at an equivalence ratio ranging from about 0.2:1 to about 1:1, wherein equivalence ratio is defined as the actual mole ratio of fuel to oxidant combusted relative to the mole ratio of fuel to oxidant of the stoichiometric chemical combustion reaction (i.e. mole ratio of fuel to oxidant for perfect combustion to $CO_2$ and $H_2O$). Flow rates of the fuel and oxidant are any such flow rates that produce sufficient thermal output for the purpose intended. Such flow rates are well known in the art. Likewise, any temperature and pressure within the catalytic combustor may be employed sufficient for the intended thermal output, as known in the art. Advantageously, the stove temperature ranges from about 25° C. to about 400° C., preferably, up to about 350° C. Once catalytic combustion is initiated, the combustion is flameless and self-sustaining.

Figure 3:
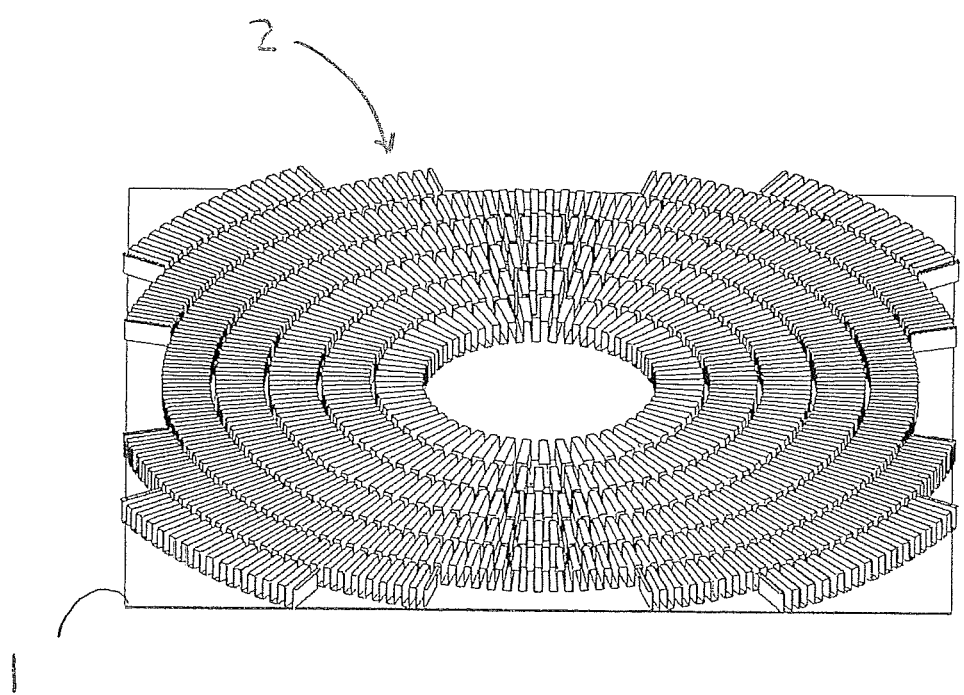
FIG. 3 depicts a fin assembly for a flameless cooking apparatus in accordance with the present invention.

The heat spreader, to which the catalyst is physically contacted, is constructed of any thermally conductive metal capable of withstanding combustion conditions. Preferred materials include, without limitation, stainless steel, aluminum, copper, and alloys, such as nickel alloys. Preferably, the metal is provided in sheets having a thickness from about 25 μm (0.001 inch) to about 500 μm (0.020 inch). More preferably, with reference to FIG. 1, the heat spreader (2) is comprised of metallic sheets bent and folded, preferably, into a corrugated set of fins. For the purposes of this invention, the term "corrugated" refers to a structure having alternating ridges and furrows (i.e., fins). Each fin is advantageously designed from about 6 millimeters (mm) (¼ inch) to about 50 mm (2 inches) in height and from about 12 mm (½ inch) to about 75 mm (3 inches) in length. Advantageously, the pitch, i.e., the number of fins per inch, ranges from about 5 fins per inch (2 fins per cm) to about 50 fins per inch (20 fins per cm). The corrugated fins are constructed, more preferably, with 90° angles at the top of the ridges and bottom of the furrows for maximum contact with both the catalyst (3) and the conductive surface (1), preferably, the interior face of a cooking surface. Once formed, the fins are then preferably arranged in concentric circles extending to a radius the size of any desired burner griddle. Refer to FIG. 3. The conductive surface may be designed to cover one burner or a plurality of burners, with one, two or four burners being a preferred number for the conductive/cooking surface; but the invention is not limited to any specific number. A more preferred cooking surface provides for a surface of about 120 cm by 69 cm (4 feet by 2.3 feet).

With reference to FIG. 3, in a preferred embodiment, each fin is bent along its length into a slight wave shape so as to maintain squareness of the bends and to ensure flat surfaces for contact with the catalyst and the conductive surface. Even more preferably, the concentric circles of fins are arranged with the waves pointing in substantially the same direction, such that the wave faces one direction in one circle and faces substantially the same direction in any adjacent circle.

Since conduction is the preferred method of transferring heat of combustion, the fins should physically contact the underside of the conductive surface, preferably, with minimal thermal contact resistance. Towards this end, contact points can be welded or brazed onto the fins; or alternatively, the fins can be pressure contacted to the conductive surface. One embodiment comprises fashioning contact welds onto the fins. In this method, a copper bar is knurled with an axial rib pattern. The bar is sliced into discs from about 0.05 cm to about 0.5 cm in thickness; and one disc is then joined to a welding electrode rod (i.e., the axis of the rod is joined to the edge of the disc). Thereafter, as an intermittent current is applied through an electrode, the disc is rolled across the area of each fin, more specifically, each ridge that will contact the (interior face of the) conductive surface. There is no necessity to put weld contacts onto the furrows of the fins that contact the combustion catalyst; and in fact, it is preferred not to do so. This welding method results in a series of uniform welds in close succession spanning the width of the disk.

In an alternative embodiment, the heat spreader and the conductive surface may comprise one composite unit that is cast from a mold or machined from one block of heat conductive material. For example, it is envisioned that the composite unit may be constructed to comprise a face consisting of the conductive surface and an opposite face comprising a plurality of ridges that contact the combustion catalyst and a plurality of channels or grooves through which combustion gases can flow.

Advantageously, the heat spreader provides for a uniform flow and heat distribution of the fuel/oxidant mixture and combustion gases along the underside of the conductive (i.e., cooking) surface. The conductive surface comprises any conventional heat conductive material that can withstand the heat of combustion, including without limitation stainless steel, aluminum, iron, and copper. Optionally, the exterior face of the conductive surface may be treated with any non-stick coating for improved cooking performance. The conductive surface is not limited in design. The surface may be flat analogous to a tabletop, or it may contain one or a plurality of dimples, grooves, drains, holes, apertures, and/or other surface structure(s) for improved heat distribution, or drainage or disposal of fluids and/or solids (e.g., oils, liquids, scraps), or conduits for exhaust gases.

The exhaust gases flow through the channels in the heat spreader and then conventionally vent to the atmosphere directly or through one or more additional outlet means. The exhaust gases may be ducted, if desired. In a preferred embodiment, the exhaust gases flow into a recuperator wherein heat of combustion is recovered, prior to venting the gases into the atmosphere. Recuperation advantageously reduces the temperature of the combustion gases, which therefore allows for a reduced quantity of heat exhausted into the atmosphere. A reduction of heat in the atmosphere allows for comfortable temperature conditions in the environment around the catalytic burner, a particular advantage for kitchen personnel in cooking applications. For overall heat efficiency of the burner, heat recovered through the recuperator is advantageously used to pre-heat inlet air. In addition to boosting overall thermal efficiency, the recuperator has the important function of reducing liquid fuel droplet/stream evaporation time by elevating the average temperature at the air inlet to greater than about 30° C. and less than about 250° C., which increases the evaporation coefficient several fold.

Figure 4:
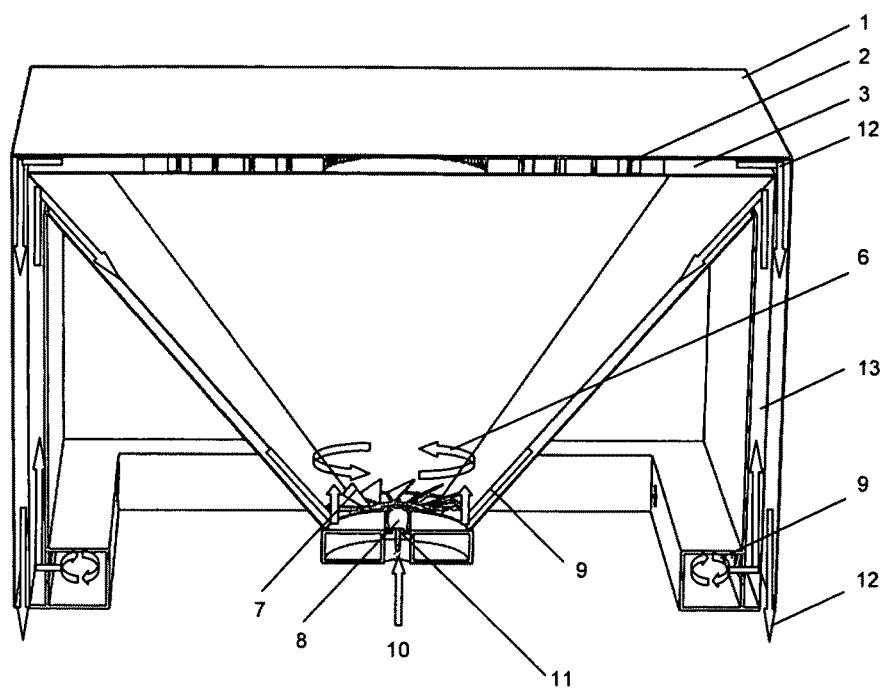
FIG. 4 depicts a flameless cooking apparatus positioned within a housing designed with a recuperator for recovery of heat of combustion, in accordance with the present invention.

As shown in FIG. 4, in a preferred embodiment of the invention, a recuperator can be integrated into the flameless cooking apparatus, comprising the catalytic burner and combustion chamber with fuel and air inlets. (In FIG. 4, parts 1-11 are analogous to those corresponding parts described in FIG. 2.) A primary function of the recuperator is to transfer heat from the combustion gases to the inlet oxidant so as to increase the overall burner heat efficiency. The recuperator, as shown in FIG. 4, is constructed by placing the air inlet path (9) adjacent to the exhaust outlet path (12), the two paths being separated by a heat exchanging wall (13). Accordingly, cooking exhaust gases exit the recuperator at a low temperature, because a substantial quantity of heat therein is absorbed by the inlet air via the recuperator. The recuperator is advantageously constructed of any heat conductive material that withstands combustion conditions, preferably, aluminum or stainless steel, more preferably, aluminum. The recuperator may have any conventional shape, including a flat surface, a corrugated surface, or a surface comprising a plurality of fins and/or other structures for enhanced heat transfer. Additionally, the recuperator provides an external burner housing and functions to shield the combustion hot zone for added safety. Insulation can be applied to this housing for increased safety and retardation of heat losses. The exhaust from the recuperator can be ducted, if desired.

The Balance of Appliance (BOA) may consist, for example, of one or more air blowers, optional fuel pump, igniter (e.g., glow plug) as may be required, and instrumentation and controls designed preferably to be lightweight, compact, and low power draw components. An ignition means, analogous to a glow plug, may be used to heat or light a flame in the presence of fuel and air, typically at ambient conditions (taken as about 22° C. and 1 atmosphere pressure). A control logic for startup, shutdown, and temperature control can be advantageously identified and implemented in a manner known to one skilled in the art.

Embodiment of the Invention

Example 1

A cooking griddle (18"×18"; 2.25 ft$^2$) (45.7 cm×45.7 cm; 2,088 cm$^2$) in accordance with this invention was constructed in the manner shown in FIG. 2. The housing was constructed of aluminum. The cooking surface consisted of a 0.075 inch (1.88 mm) thick stainless steel sheet chosen for ease of fabrication and heat resistance. A heat spreader was constructed from 0.003 inch (0.075 mm) thick Grade 304 stainless steel sheet. The sheet was bent into a plurality of corrugated fins (1 inch long by ½ inch high, 10 fins/inch) (2.50 cm long by 1.25 cm high, 4 fins per cm), as shown in FIG. 1 (2) and FIG. 3. A series of resistance welds was made onto the ridge of each fin (top side contacting underside of cooking surface FIG. 1(5)) by means of the copper electrode method described in detail hereinabove. A Microlith® brand combustion catalyst obtained from Precision Combustion, Inc. of North Haven, Conn., and comprising noble metal deposited on ultra-short-channel-length metal mesh substrate, was positioned in direct physical contact with the heat spreader. The heat spreader (2) provided heat conduction from the combustion catalyst (3) to the cooking surface (1), as well as providing a plurality of channels for distributing hot combustion gases uniformly over the underside of the cooking surface. Moreover, the heat spreader provided additional mechanical stiffening to the cooking surface; and the channels provided an outlet pathway for combustion gases. The cooking surface, heat spreader, and combustion catalyst comprise the parts of the catalytic burner assembly.

JP-8 fuel and air were the chosen fuel and oxidant. A fuel/air flow path (FIG. 2, parts 11, 9 & 10) constructed of stainless steel was located below the griddle assembly. A fuel nozzle (8) was located at the outlet of the fuel/air flow path. A commercially available pressure atomizer (8), obtained from Hago, Inc., was used to provide a fine fuel spray onto the catalyst. A stainless steel swirler (7) was located co-axially to the fuel nozzle to provide mixing between the fuel and air streams. The air stream was split into two inlet streams: a primary air stream fed at 90 SLPM through air inlet (9) and a secondary air stream fed at 8 SLPM through air inlet (10). Air inlet stream (10) was fed at ambient temperature (23° C.); whereas to simulate the use of a recuperator, air inlet stream (9) was fed through a pre-heater to raise the temperature to 210° C. Air passing through air inlet (10) was pressurized and injected with JP-8 fuel fed through fuel inlet (11) into the combustion chamber (6). Fuel flow was 153 ml/hr.

Figure 5:
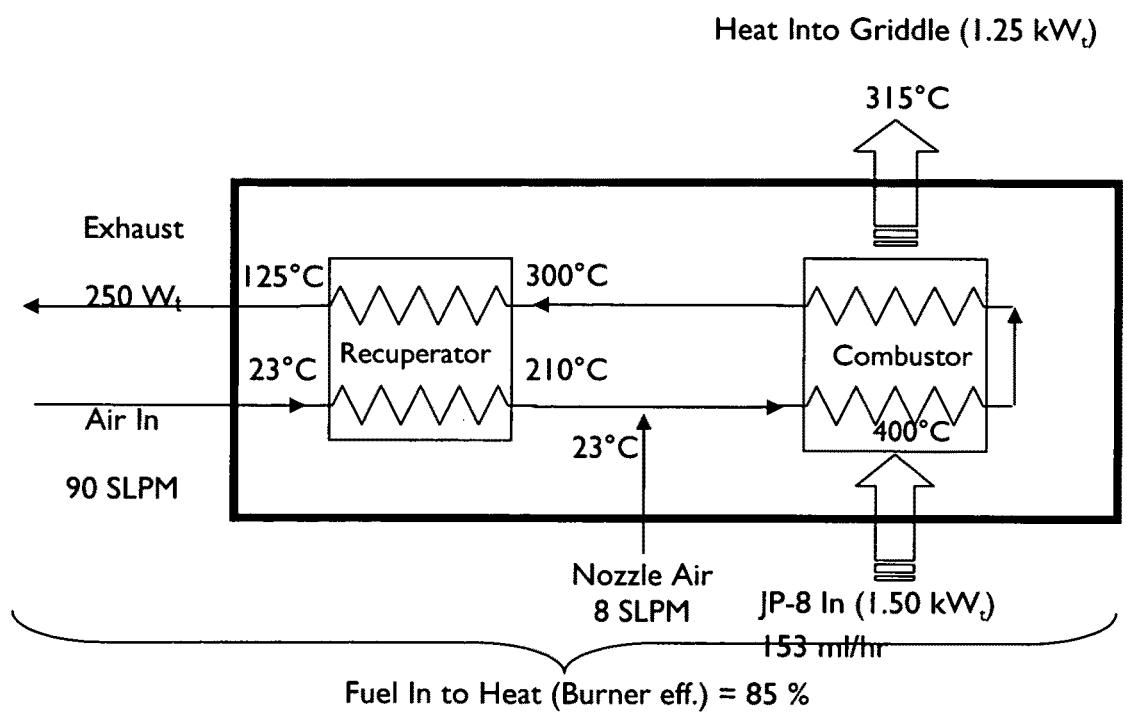
FIG. 5 illustrates a schematic flow chart depicting fuel and oxidant flows and heat input and heat output for the embodiment of the invention.

The catalyst was lit-off and flameless combustion of the fuel with air was maintained at 400° C. FIG. 5 illustrates a schematic chart of heat transfer values for the apparatus of this embodiment. Thermal input from the JP-8 fuel to the combustor was calculated as 1.50 kWth (5 k BTU/hr). Thermal energy was conductively transferred through the heat spreader to the griddle surface, which operated at a temperature of 315° C. Total heat into the griddle was measured 1.25 kW$_{th}$ (4.3 k BTU/hr), for an overall burner efficiency (fuel to heat) of 85 percent. Combustion gases were exhausted at 300° C. with a simulated temperature of 125° C. exiting from a recuperator and an exhaust energy of 250 W$_{th}$ (850 BTU/hr). Temperature was measured by appropriate placement of K-type thermocouples at the inlet and outlet ports, on the catalyst surface, and on the cooking surface. Burner combustion efficiency was evaluated using an Agilent Micro gas chromatograph (GC) that measured products of combustion in the exhaust gas. Results are shown in Table 1.

TABLE 1

Exhaust Gas Composition (mole %)[1,2]

| Relative Time (hr) | H$_2$ | O$_2$ | N$_2$ | CH$_4$ | CO | CO$_2$ | Total |
|---|---|---|---|---|---|---|---|
| 0 | 0.001 | 16.38 | 77.28 | N.D. | N.D. | 2.86 | 96.5 |
| 0.43 | 0.001 | 16.32 | 77.27 | N.D. | N.D. | 2.85 | 96.4 |
| 0.46 | 0.001 | 16.30 | 77.54 | N.D. | N.D. | 2.90 | 96.7 |
| 25.1 | 0.001 | 15.66 | 73.72 | N.D. | N.D. | 2.78 | 92.2 |
| 48.3 | 0.001 | 15.69 | 74.11 | N.D. | N.D. | 2.81 | 92.6 |

[1]Gas Feed: Fuel 153 ml/h; Air: 90 SLPM simulated recuperation at 210° C. & 8 SLPM at 23° C.
[2]N.D. = not detectable As seen from Table 1, complete combustion was evidenced by the inability to detect carbon monoxide in the combustion exhaust gases. This means that the concentration of CO was less than 0.001 percent (<10 ppm), the lower detectable limit of the GC. Additionally, no hydrocarbons, such as methane, ethane, propane, were detectable by GC. Thus, combustion efficiency was greater than 99.9 mole percent. These results indicate that the flameless cooking apparatus of the present invention meets safety standards for indoor use.

Figure 6:
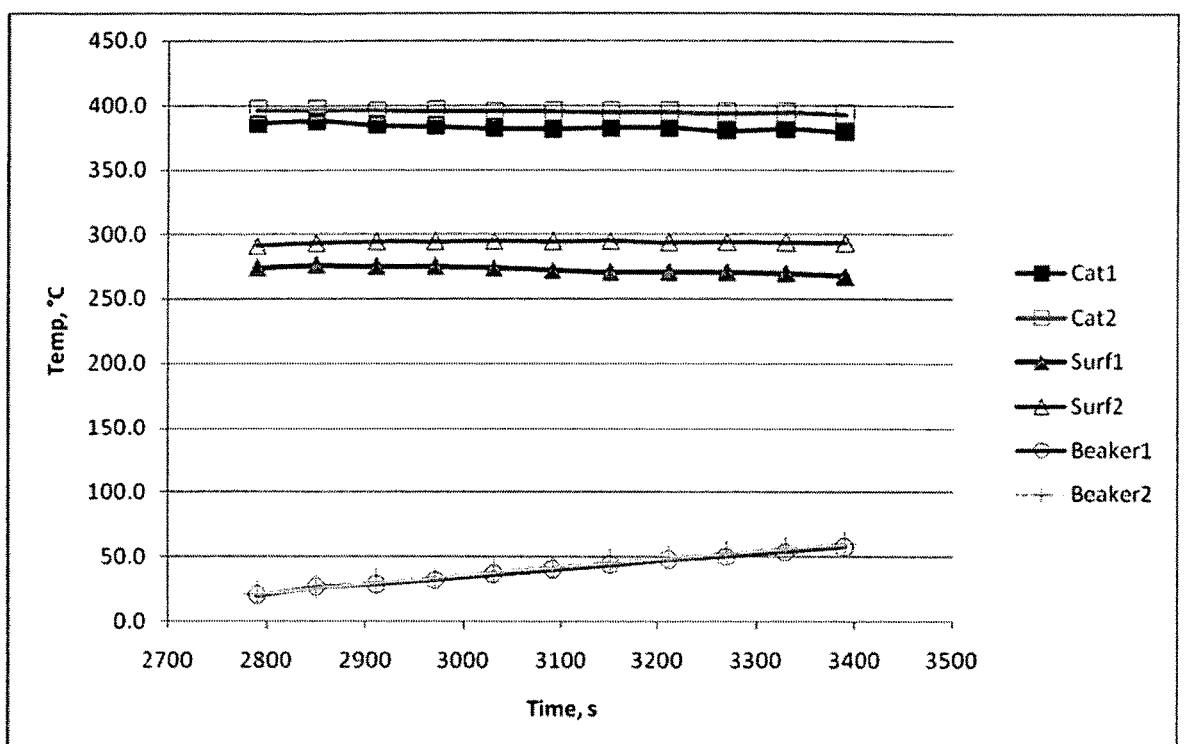
FIG. 6 depicts a graph of temperature as a function of time for an apparatus operating in accordance with this invention.

To measure griddle efficiency, a test was performed wherein the griddle was used to heat a beaker filled with water. The experiment was repeated with a second beaker of water. Temperature was measured as a function of heating time at two points on the catalyst surface, two points on the griddle surface, and in the two beakers of water placed on the griddle, with the results graphed in FIG. 6. As shown in the figure, the temperature of the catalyst was close to 400° C. throughout the test. The temperature of the griddle surface was between 275° C. and 300° C. throughout the test. The water temperature in the beakers rose gradually over the heating time from ambient (23° C.) at the starting time to 50° C. at 3400 sec (56.6 min). Based on conventional calculations, the thermal input of the fuel was estimated as equal to 13.3 kW/m$^2$, and the heat flux into the beaker was estimated as equal to 11.4 kW/m$^2$. Accordingly, the thermal efficiency of the apparatus was calculated to be 88 percent.

While preferred embodiments of the present invention have been described and illustrated hereinabove, it is to be understood that the embodiments are exemplary of the invention and are not intended to be limiting thereof. Additions, omissions, substitutions, or other modifications can be made thereto without departing from the spirit or scope of the present invention.

The invention claimed is:

1. A flameless cooking appliance comprising:
   (a) a combustion chamber comprising a catalytic burner positioned as the top horizontal wall of the chamber, and further comprising one or more contiguous walls enclosing a volume of space within which flameless combustion occurs;
   (b) a fuel inlet means for feeding a fuel into the combustion chamber;
   (c) an oxidant first inlet means for feeding an oxidant into the chamber;
   (d) an ignition means for lighting off a combustion catalyst, the ignition means positioned within the chamber; and
   (e) wherein the catalytic burner comprises three components disposed in a sandwich configuration:
      (i) the combustion catalyst defining a bottom face and a top face along a vertical axis and comprising a metal substrate configured with a plurality of channels of ultra-short channel length having one or more noble metals deposited thereon, the combustion catalyst positioned interior to the chamber in a direction downstream of the fuel inlet means and oxidant first inlet means such that the fuel inlet means and oxidant first inlet means are configured to deliver fuel and oxidant to the bottom face of the combustion catalyst and combustion gases exit the top face of the combustion catalyst;
      (ii) a thermally-conductive metal heat spreader comprising a plurality of metal sheets bent and folded into a structure of alternating ridges and furrows forming corrugated fins having multiple flat contact surfaces configured for thermal conductive heat transfer; and
      (iii) a heat conductive surface comprising an interior face positioned interior to the chamber and an exterior face positioned exterior to the chamber; and
   further wherein the heat spreader is disposed inside the area between the combustion catalyst and heat conductive surface, wherein the heat spreader is in conductive contact with and is sandwiched in between the combustion catalyst and the heat conductive surface, and the heat spreader multiple flat contact surfaces comprises a plurality of solid-to-solid thermally conductive contact surfaces overlaid across the top face of the combustion catalyst and also overlaid across the interior face of the heat conductive surface; the heat spreader further providing a plurality of channels for exhausting combustion gases from the combustion chamber.

2. The apparatus of claim 1 further comprising a swirling means for mixing the fuel and oxidant prior to contact with the combustion catalyst.

3. The apparatus of claim 1 further comprising a recuperator comprising a heat conductive material, the recuperator positioned in fluid communication with the channels of the heat spreader and further positioned adjacent to the oxidant first inlet means and configured to share a heat exchanging wall with the oxidant first inlet means.

4. The apparatus of claim 3 wherein the recuperator is a heat conductive material selected from aluminum and stainless steel, optionally, having a surface that is flat, corrugated, or shaped into a plurality of fins.

5. The apparatus of claim 1 wherein the metal substrate comprises a metal mesh and the one or more noble metals are selected from platinum, palladium, and rhodium.

6. The apparatus of claim 1 wherein the ignition means comprises a glow plug.

7. The apparatus of claim 1 wherein the metal heat spreader is selected from stainless steel, aluminum, copper, and alloys of nickel.

8. The apparatus of claim 7 wherein the metal heat spreader sheets have a thickness from 25 μm to 500 μm.

9. The apparatus of claim 1 wherein the metal substrate is provided in a stack of from 2 to 20 layers.

10. The apparatus of claim 1 wherein the fuel inlet means is configured to feed and atomize a liquid fuel.

11. The apparatus of claim 10 wherein the fuel inlet means comprises a nozzle or injector configured to feed and atomize a liquid fuel.

12. The apparatus of claim 1 wherein the metal substrate has an ultra-short channel length ranging from 25 microns to 500 microns.

13. The apparatus of claim 1 further comprising an oxidant second inlet means positioned upstream of the catalytic burner and positioned to facilitate atomization of the fuel fed through the fuel inlet means.

* * * * *